US006805526B2

(12) United States Patent
Stefani (10) Patent No.: US 6,805,526 B2
(45) Date of Patent: Oct. 19, 2004

(54) AUTOMATIC STORE (75) Inventor: Franco Stefani, Modena (IT)

(73) Assignee: System SpA, Modena (IT)

( * ) Notice: Subject to any disclaimer, the term of this patent is extended or adjusted under 35 U.S.C. 154(b) by 82 days.

(21) Appl. No.: 10/215,240

(22) Filed: Aug. 9, 2002

(65) Prior Publication Data
US 2003/0185657 A1 Oct. 2, 2003

(30) Foreign Application Priority Data
Mar. 29, 2002 (IT) ................................. MO2002A0076

(51) Int. Cl.$^7$ ................................................ B65G 1/00
(52) U.S. Cl. ........................ 414/281; 414/280; 414/278
(58) Field of Search ................................. 414/278, 280, 414/281

(56) References Cited

U.S. PATENT DOCUMENTS

| 2,954,882 | A | * | 10/1960 | Dailey ........................ 100/196 |
| 3,337,069 | A | * | 8/1967 | Burger ........................ 414/278 |
| RE27,223 | E | * | 11/1971 | Nelson ........................ 414/278 |
| 4,265,582 | A | * | 5/1981 | Theobald ..................... 414/279 |
| 5,141,381 | A | * | 8/1992 | Kato et al. ................... 414/273 |
| 5,147,176 | A | * | 9/1992 | Stolzer et al. ................ 414/807 |
| 5,199,840 | A | * | 4/1993 | Castaldi et al. .............. 414/280 |
| 5,281,070 | A | * | 1/1994 | Stolzer ........................ 414/281 |
| 5,551,823 | A | * | 9/1996 | Maruyama ................... 414/280 |
| 5,626,453 | A | * | 5/1997 | Bouche ....................... 414/280 |
| 6,602,037 | B2 | * | 8/2003 | Winkler ....................... 414/273 |

* cited by examiner

Primary Examiner—Joe Dillon, Jr.
(74) Attorney, Agent, or Firm—Browdy and Neimark, P.L.L.C.

(57) ABSTRACT

At least one vertical structure is constituted by plurality of planes, set one upon another, each of which can house at least one container. A lift truck is able to transport at least one of the containers and can move in a vertical direction in a vertical work space parallel to the vertical surface on which the planes are aligned. The lift truck on command can be positioned facing one of the planes, and can interact with the planes in order to remove or insert a single container. The invention comprises a plurality of the vertical structures which are arranged parallel and afford a plurality of the work spaces for movement of the lift truck and are conformed to enable transfer of the lift truck at least from one of the work spaces to another of the work spaces. Means are provided to operate a transfer of the lift truck from one of the work spaces to another as well as to displace of the lift truck at least in a vertical direction along a single work space.

15 Claims, 8 Drawing Sheets

AUTOMATIC STORE

BACKGROUND OF THE INVENTION

The invention can be used generically for high-density automatic storing of very many types of goods and packages.

Specifically, though not exclusively, the invention is usefully applied for automatic storing of objects and packages of various types, but which can be stored on trays or in preferably drawer-like containers, in locations where there is no great vertical height availability.

The invention is particularly useful and installable in normal places for commercial activity which have ceiling room no greater than that usually available in normal dwellings.

Numerous types of vertical automatic stores exist in the prior art. One very widely-used type comprises, in its basic configuration: two vertical structures, reciprocally facing each other and identifying a vertically-arranged working space, each of which structures is made up of a plurality of planes or cells which are singly destined to house at least one container or tray, and are superposed so as to be facing one another on a vertically-lying surface; a lift truck able to transport at least one said container or tray and able to move, on command, inside the work space which the cells or planes face, and able to be positioned facing one of the cells or planes and interact there-with, removing or inserting a single container or tray. Also provided are devices for moving the containers or trays from the lift truck to an external transport system and vice versa, or for enabling the lift truck to transfer externally of the store to unload and/or receive containers or trays.

These realisations however have the limitation of having to be structurally suited for industrial applications i.e. with high vertical working space and necessitating location in an industrial environment.

The main aim of the present invention is to create a device for automatically storing objects and packages of various nature, which can be stored in trays or containers, which can be located spaces presenting ceiling heights no higher than can usually be found in normal dwelling-type buildings.

A further aim of the invention is to create a device for automatically storing objects, which device exhibits a parallelepiped conformation which is modularly extensible in a horizontal direction perpendicular to a front section which remains constant.

Some advantages of the invention are its simplicity of construction, in that its static parts can be made of sheet steel, and its functional simplicity.

These aims and advantages and more besides are all attained by the object of the invention, as it is characterised in the appended claims.

SUMMARY OF THE INVENTION

IN the invention, at least one vertical structure is constituted by plurality of planes, set one upon another, each of which can house at least one container. A lift truck is able to transport at least one of the containers and can move in a vertical direction in a vertical work space parallel to the vertical surface on which the planes are aligned. The lift truck on command can be positioned facing one of the planes, and can interact with the planes in order to remove or insert a single container. The invention comprises a plurality of the vertical structures which are arranged parallel and afford a plurality of the work spaces for movement of the lift truck and are conformed to enable transfer of the lift truck at least from one of the work spaces to another of the work spaces. Means are provided to operate a transfer of the lift truck from one of the work spaces to another as well as to displace of the lift truck at least in a vertical direction along a single work space.

DESCRIPTION OF THE PREFERRED EMBODIMENTS

With reference to the figures, 1 denotes a vertical structure constituted by a plurality of planes 2 each able to house at least one container 3, which are superposed so as to be facing each other on a vertical plane. The static part of the store of the invention comprises a plurality of structures 1 parallel and side-by-side so as to generate a sort of plurality of stores 17 each of which comprises two vertical structures 1 reciprocally facing and affording there-between a vertically-extended work space 4.

A lift truck 5 can transport at least one of the containers 3 and can move, on command, in a vertical direction in a work space 4 and can therefore be positioned facing one of the planes 2.

The lift truck 5 is provided with an extractor-inserter device 18 for interacting with a single plane 2, either removing a single container 3 from it or inserting one in it.

The vertical structures 1, which are arranged parallel to identify a plurality of the work spaces 4 for the lift truck 5, are conformed to enable transfer of the lift truck 5 from one work space 4 to another in a direction which is perpendicular to the vertical dimension of the structures.

The vertical structures 1 have tunnel-shaped bases so as to afford a runway, perpendicular to the larger dimensions of the vertical structures 1, along which the lift truck 5 can run to transfer at least one work space 4 to another and/or to stations 19 external of the vertical structures 1.

Means are provided to transfer the lift truck 5 from one work space 4 to another as well as to transfer the lift truck 5 at least in a vertical direction along a single work space 4.

The means comprise:

first fixed tracks 6 along the work space to guide the lift truck 5; second fixed tracks 7, associated to the vertical structures 1, to guide the lift truck 5 in a vertical direction along the single work space 4;

means for drawing the lift truck 5, associated to the lift truck 5 and interacting with the first fixed tracks 6 or the second fixed tracks 7 to produce a controlled translation in both directions of the lift truck 5 along the first fixed guides 6 or along the second fixed guides 7. These means for drawing comprise drawing groups 8 which are predisposed, together with the first fixed tracks 6 or with the second fixed tracks 7, to form couplings for transmission of non-dragging drive which achieves controlled movement of the lift truck 5 with respect to the vertical structures 1, enabling a precise positioning of the lift truck 5 in front of the single planes 2.

The lift truck 5 comprises, on each side thereof, two opposite-facing drawing groups 8 which are aligned along the first fixed tracks 6, with which they are predisposed to interact (with a sliding coupling for transmission of non-dragging drive).

The drawing groups 8 interact with the facing second fixed tracks 7 which are fixed to two facing vertical structures defining a work space 4.

In particular, the facing drawing groups 8 are symmetrically pivoted to each of the two sides of the lift truck 5 about two axes which are perpendicular to a vertical plane identified by the first fixed tracks 6 and the two second fixed tracks 7, facing and fixed to two facing vertical structures 1.

Two facing drawing groups 8 are commanded to make symmetrical displacements from the coupling position with the first fixed tracks 6 to the coupling position with the second fixed tracks 7 and vice versa by a self-centring device comprising a rotor 9 which is hinged to the first ends of two con rods 10 having second ends hinged to frames of the two opposite drawing groups 8.

In a first embodiment each drawing group 8 comprises a frame 11 on which two wheels 12 and 13 are mounted. The two wheels 12 and 13 have parallel axes on which a chain 14 is ring-wound, which chain 14 bears a plurality of aligned and equidistanced holes 15.

The first fixed tracks 6 and the second fixed tracks 7 are provided with projecting pins 16 which are aligned, equidistanced and sized so as to insert snugly in the corresponding holes 15 in the belts 14 when the holes 14 are brought side-by-side to the first tracks 6 or the second tracks 7; a sort of enmeshing is enacted.

At least one of the two wheels 12 and 13 is a drive wheel and draws the chain 14 in rotation.

In the illustrated embodiment wheel 13 the drive wheel; it is cogged, as is the chain 14, which couples with the cogwheel 13 and is thereby driven.

The whole drawing group 8 is pivoted about the axis of the cogwheel 13; thus the drawing group 8 can be made to rotate, on command, with respect to the lift truck 5, by the symmetrical self-centring device constituted by the rotor 9 and the con rods 10.

With a simple rotation of about 90° the drawing groups 8 of the lift truck 5 can be enmeshed to the first fixed tracks 6 or the second fixed tracks 7 and thus can constrain the lift truck 5 to one or the other of the tracks 6 or 7. Thus the lift truck 5 can be moved to any one of the work spaces 4 as well as internally of any single one of them. The enmeshing is achieved by the fitting of the projecting pins 16 in the first fixed tracks 6 or the second fixed tracks 7 into the holes 15 made in the chain 14 of the drawing groups 8.

In the illustrated embodiment, the coupling of the chains 14, preferably made of composite materials and/or rubber, with the projecting pins 16 is particularly efficient and quiet.

The type of coupling also provides a very simple instrument for determining the relative position of the lift truck 5 with respect to the first fixed tracks 6 and the second fixed tracks. 7.

In a second embodiment, not illustrated in the figures of the drawings, the enmeshing of the drawing groups 8 of the lift truck 5 to the first or second fixed tracks 6 and 7 is achieved differently. In this second embodiment the first tracks 6 and the second tracks 7 are not provided with projecting pins 16 but rather with equidistanced holes which go to couple with projecting pins fixed to the chains 14.

In a further embodiment the drawing group 8 comprises a frame 111 on which at least one cogwheel 113 is rotatably mounted, which cogwheel 113 is made to enmesh on command alternatively with first racks 60 and second racks 70 which are, respectively, solidly constrained to the first fixed tracks 6 and the second fixed tracks 7.

The cogwheel 113 is a drive cogwheel.

Each frame 111 is hinged to a lift truck 5 about an axis of a pivot 112 which is parallel to a rotation axis of the cogwheel 113 and is located at a predetermined distance therefrom.

The whole drawing group 8 is pivoted about the axis of the pivot 112, and is made to rotate in this way, on command, With respect to the lift truck 5, by the symmetrical self-centring device constituted by the rotor 9 and the con rods 10, practically identical to the first embodiment.

The operation of the invention, in both illustrated embodiments, is very simple. The lift truck 5 can move, on command, both horizontally along the fixed guides 6 to pass from one vertical structure 1 to another, i.e. from one work space 4 to another, and vertically internally of a single work space 4 to come into a position facing a plane 2 and either remove or insert a container 3 therein.

The lift truck 5 can also transfer to an external station 19 predisposed to function as a table, at which the user or users can access the container 3 brought by the lift truck 5.

Figure 1:
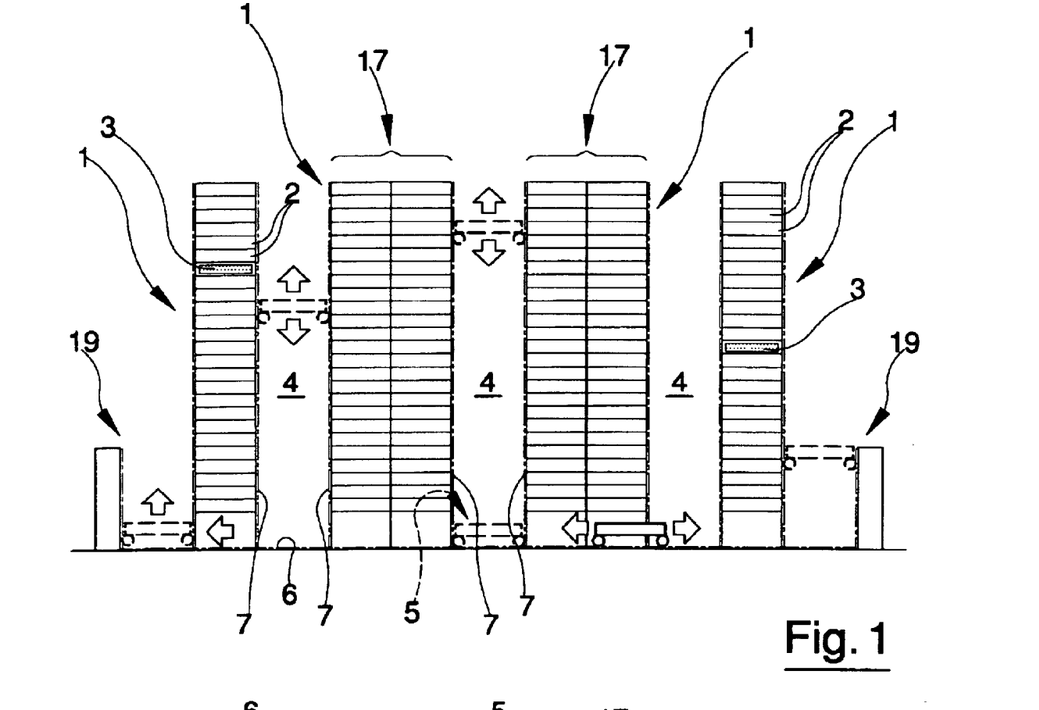
FIG. 1 is an overall front view in vertical elevation.
Figure 2:
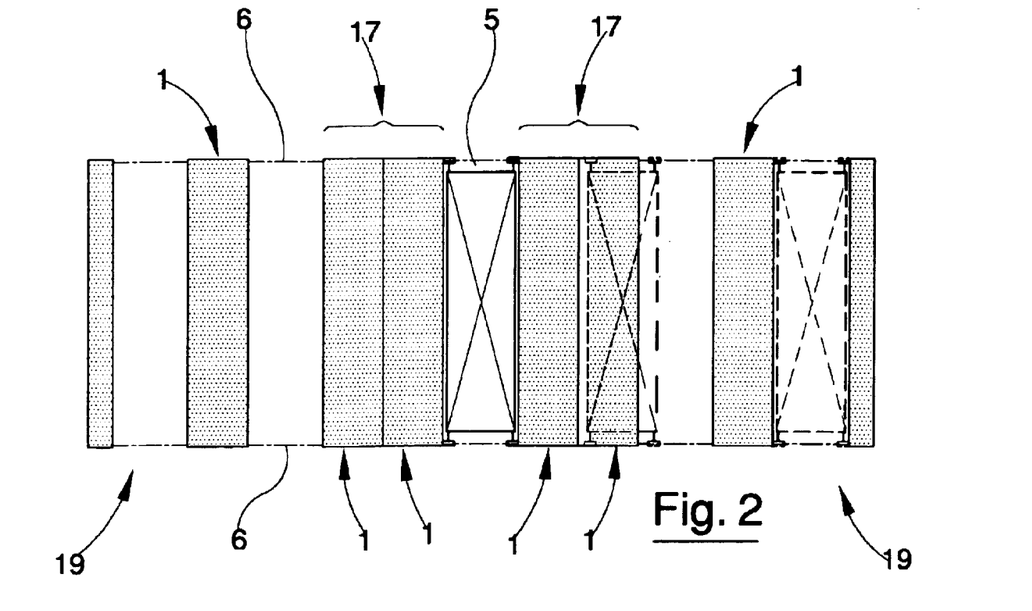
FIG. 2 is a schematic plan view from above of FIG. 1.
Figure 3:
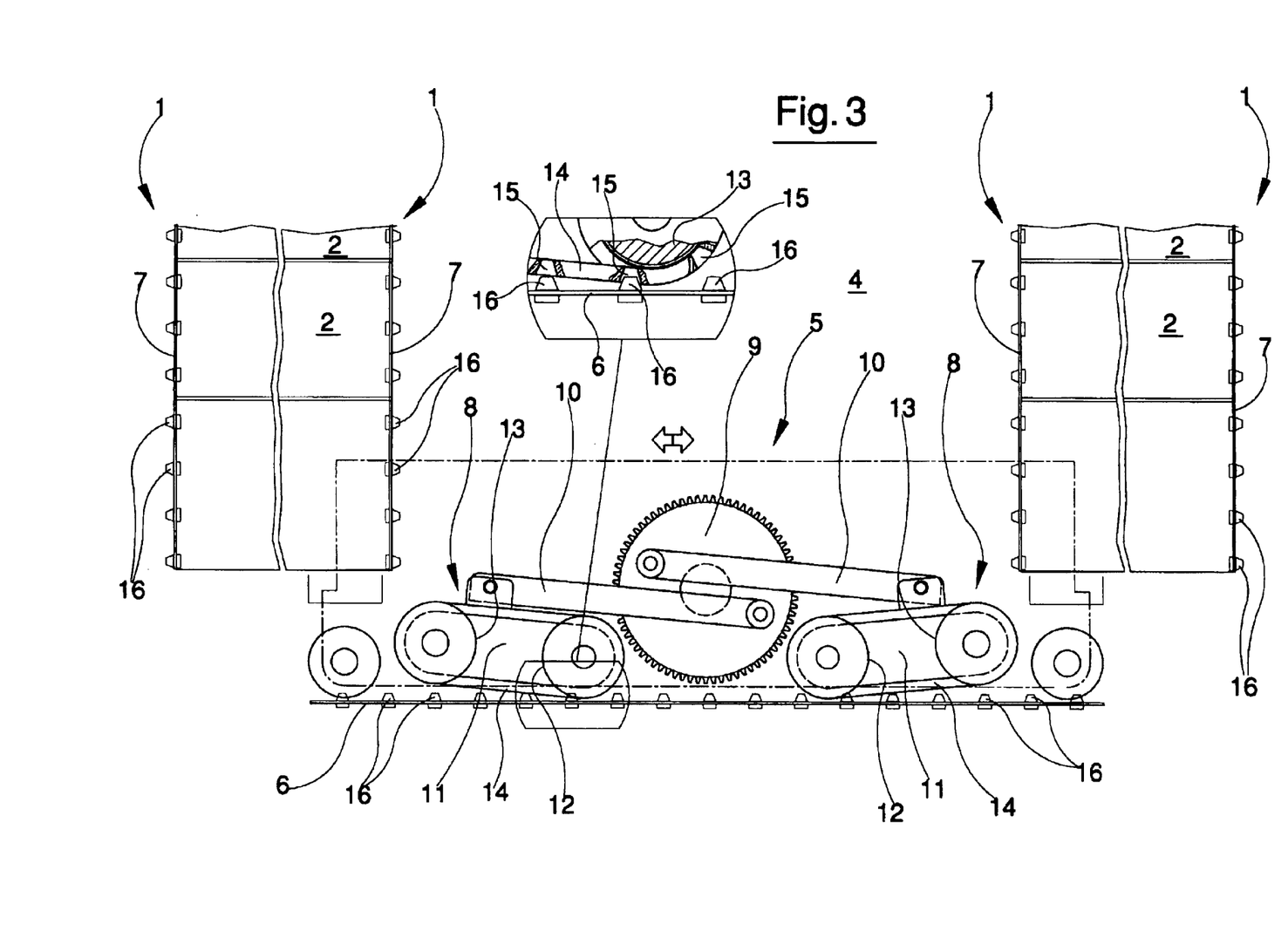
FIG. 3 is an enlarged-scale view of a detail of FIG. 1.
Figure 4:
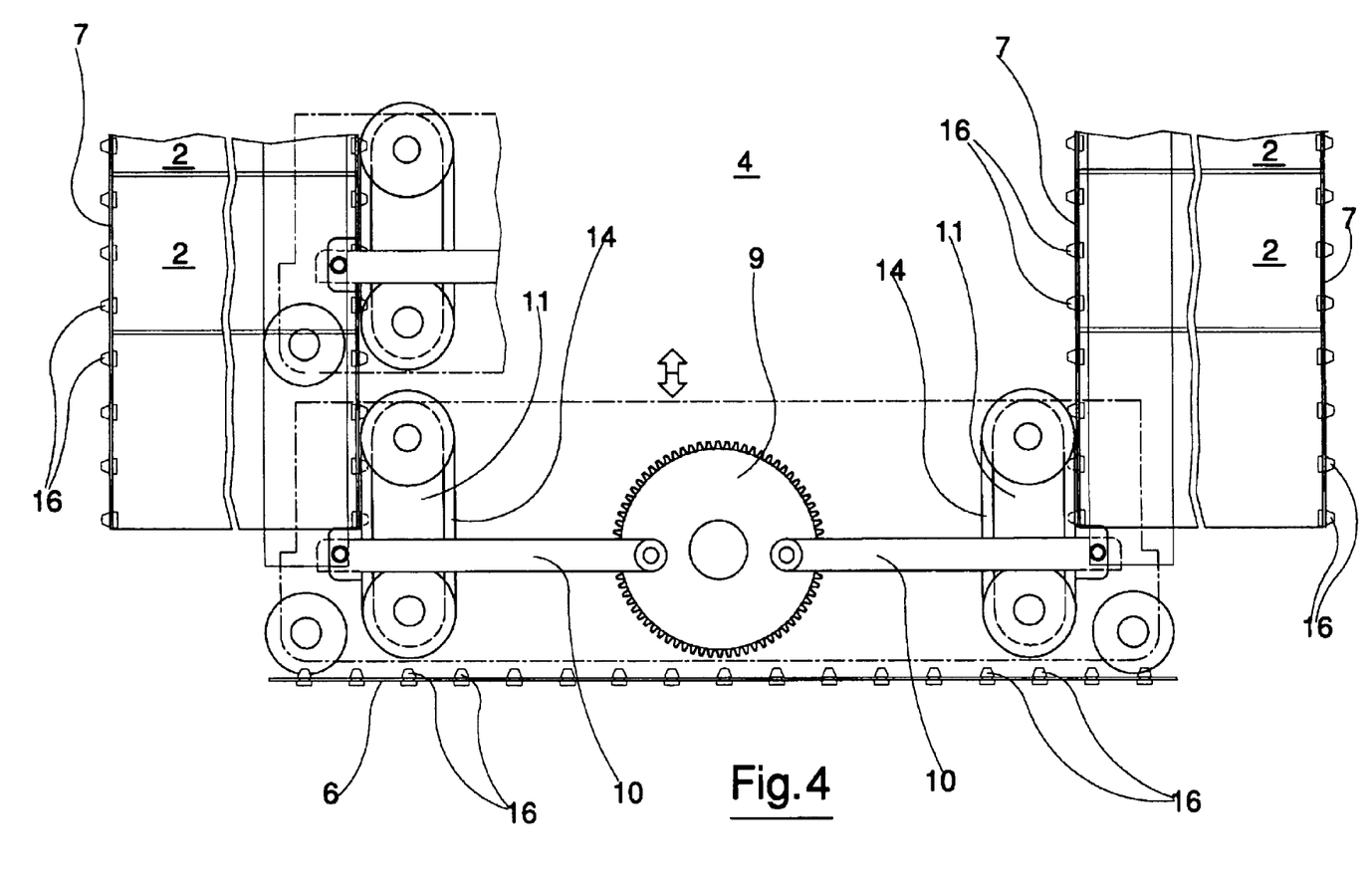
FIG. 4 is the detail of FIG. 3 shown in a different operative configuration.
Figure 5:
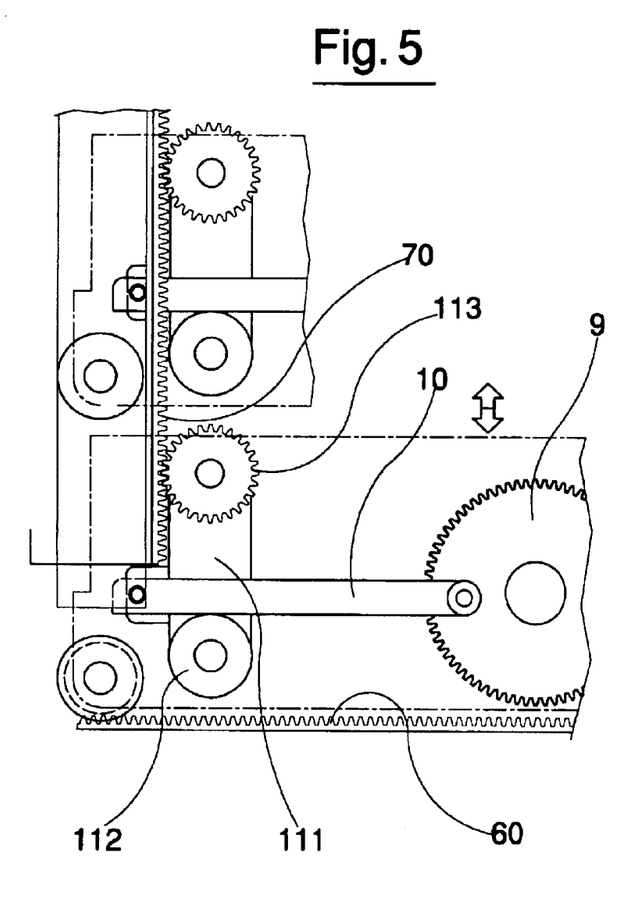
FIG. 5 is part of the view of FIG. 3 relating to a different embodiment.
Figure 6:
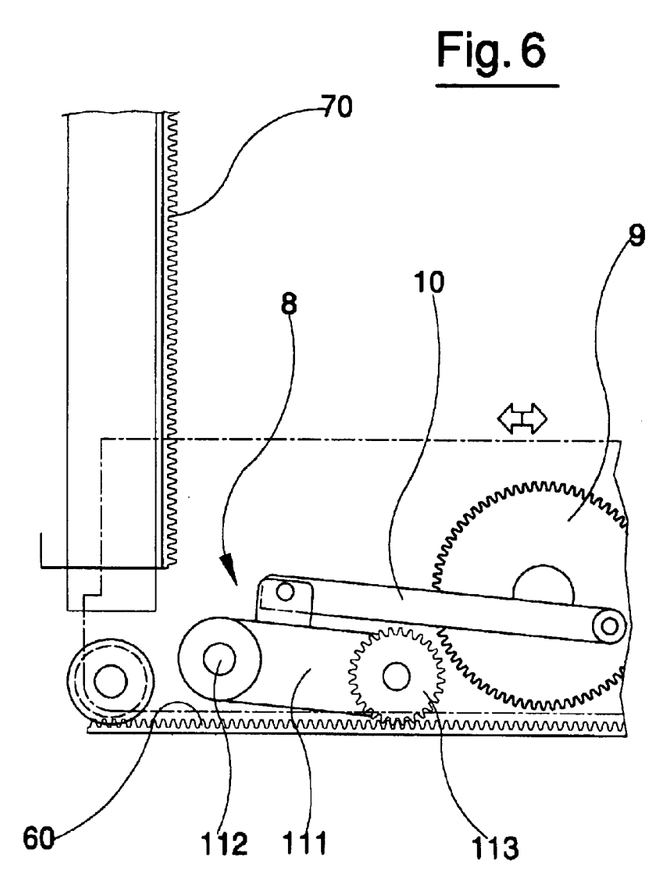
FIG. 6 is the detail of FIG. 5 shown in a different operative configuration.
Figures 7, 8, 9:
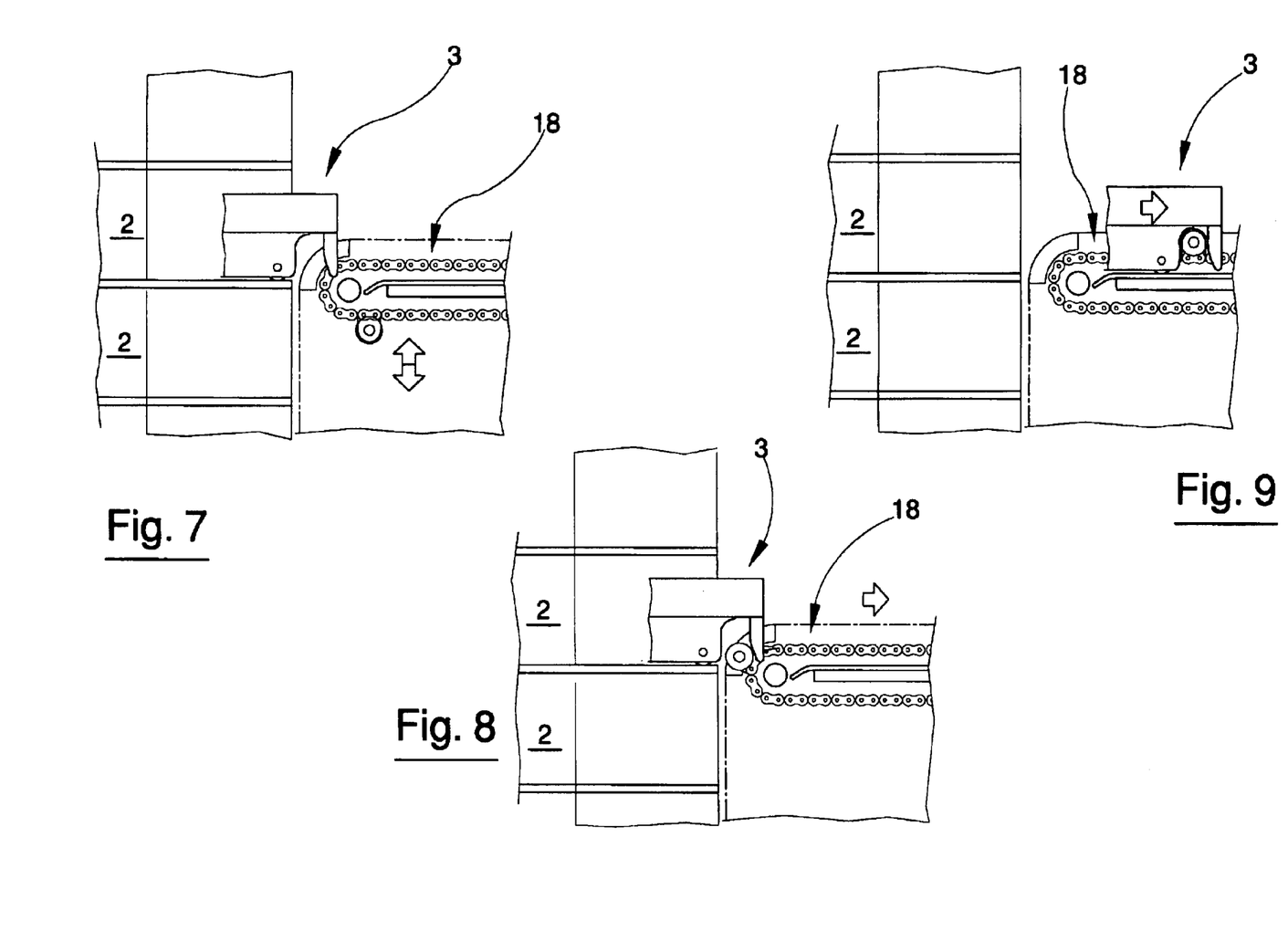
FIG. 7 is an enlarged-scale view of a detail of FIG. 1 relating to an operative stage of extraction/insertion of a container or tray 3 from or into a plane or cell.
FIGS. 8 and 9 show two different and consecutive stages of the extraction of a container or tray from a plane or cell.
Figure 10:
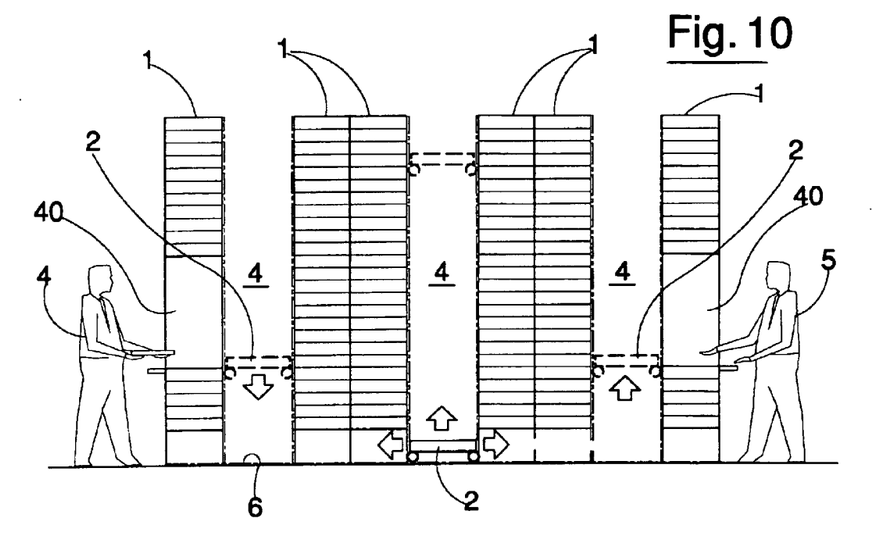
FIG. 10 shows the same front view in vertical elevation of FIG. 1, relating to a further embodiment of the invention.
Figure 11:
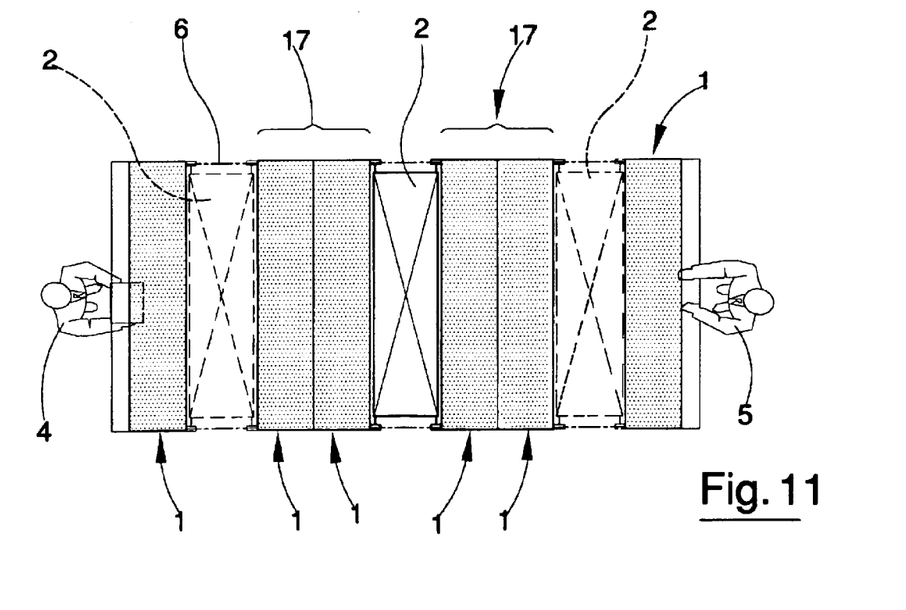
FIG. 11 shows a schematic plan view from above of FIG. 10.
Figure 12:
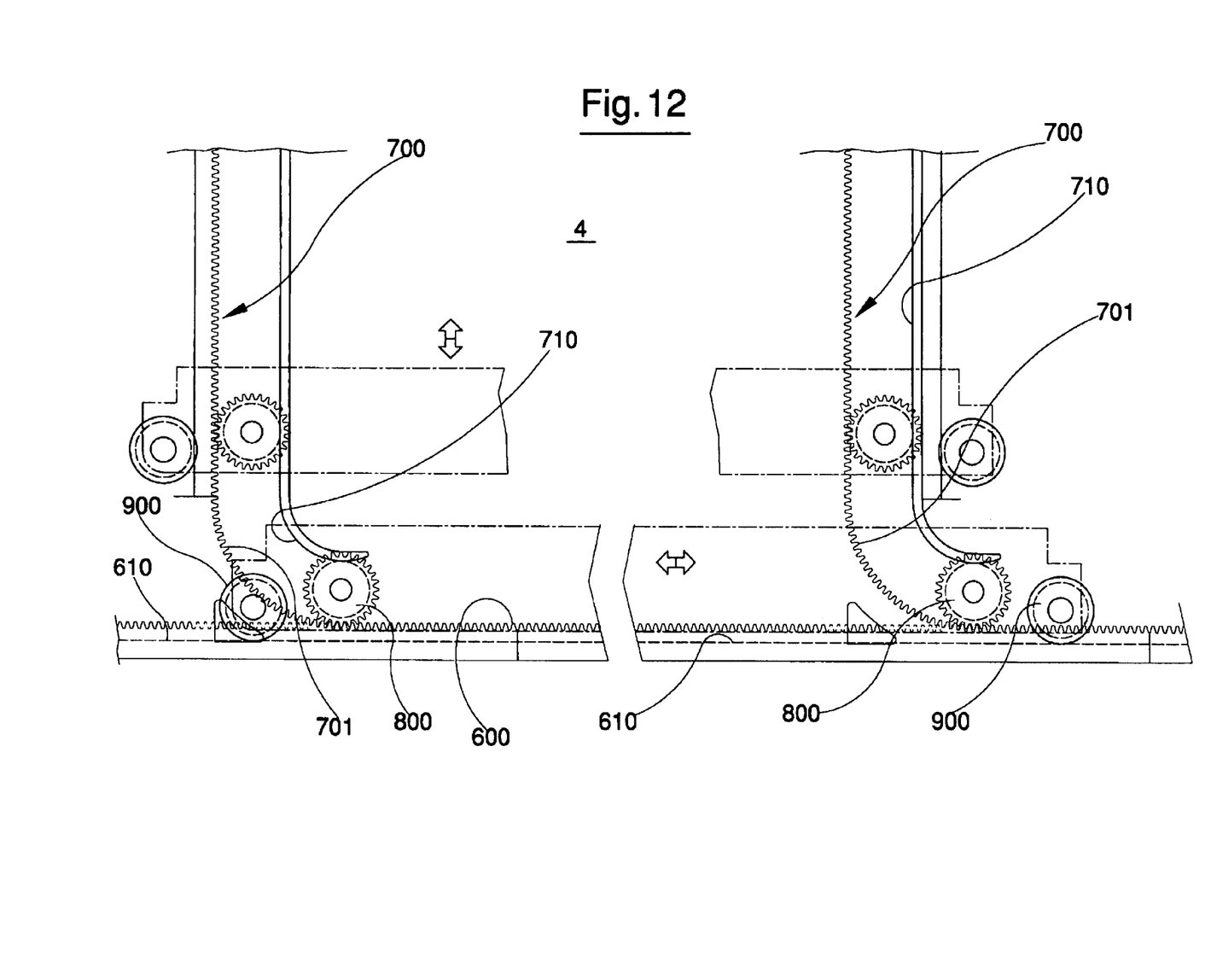
FIG. 12 shows, in enlarged scale, a detail of FIG. 10.
Figure 13:
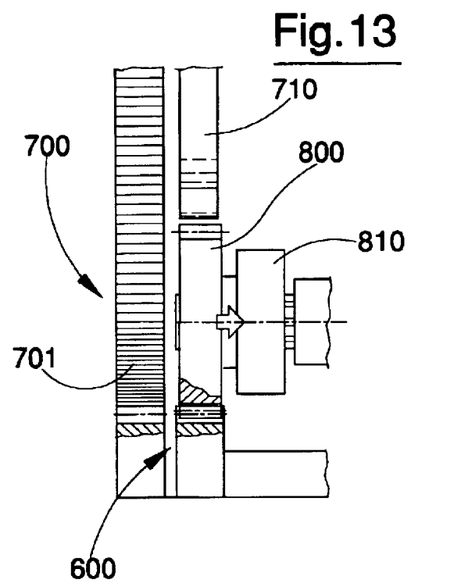
FIGS. 13 and 14 show, in enlarged scale, two different operative configurations of part of a side view from the right of FIG. 12.
Figure 14:
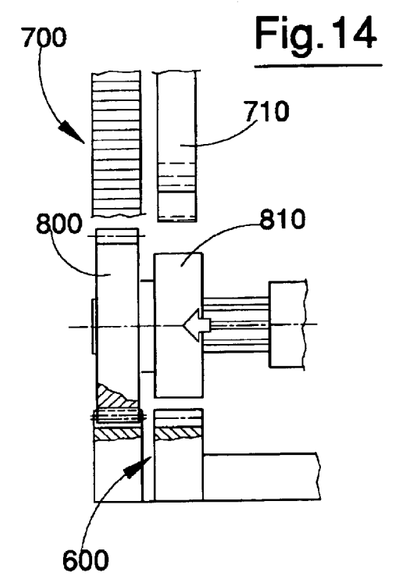
Figure 15:
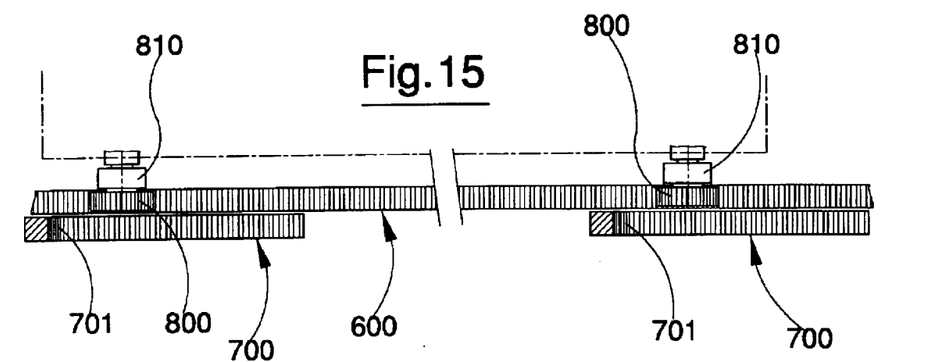
FIGS. 15 and 16 show two different operative configurations of part of a plan figure from above of FIG. 12.
Figure 16:
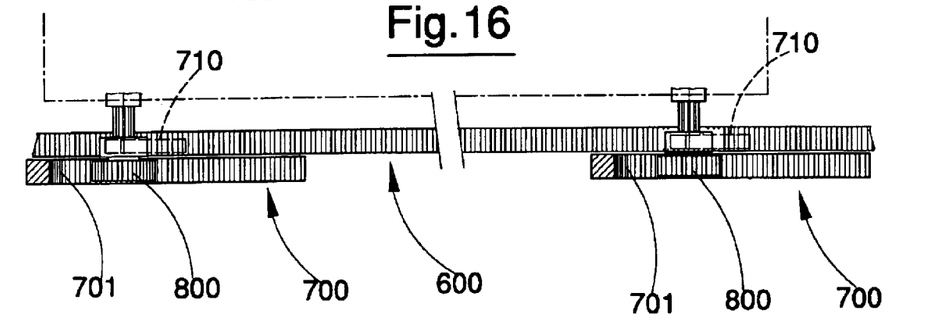

In place of an external station, an internal space in the structure could be used as a table; this internal space would not be occupied by planes 2 destined to house containers 3 but would be left empty. An embodiment of this type is illustrated in FIGS. 10 and 11, and differs from the embodiment of FIGS. 1 and 2 in that the stations 19 are not present and spaces 40 are cleared in the vertical structures 1 to be used as work tables.

This type of embodiment confers on the entire store an exactly parallelepiped shape, with no projecting parts.

The invention can be usefully applied in shops or product distribution centres which are situated in "normal" places, i.e. not places specially designed for large-scale stores. These "normal" places have ceilings which are not higher, or not significantly higher, than normal dwellings.

The invention also has the characteristic of having a modular configuration which means it can easily be adapted to the storage capacity required. It is sufficient to add or remove a predetermined number of vertical structures 1 modularly arranged one next to another in order to form the work spaces 4 for vertical movement of the lift truck 5, or lengthen or shorten the tracks 6.

Thanks to this ability the invention can be used to exploit available space to the full, as it is overall a parallelepiped shape with two constant dimensions, i.e. the front of the store, and the remaining dimension, parallel to the first tracks 6, which is modularly modifiable by the addition of modules constituted by the vertical structures 1 and relative work spaces 4, theoretically limitless.

In a further embodiment, which adds other constructional and functional advantages to those already mentioned, the means for operating the transfer of the lift truck 5 from one work space 4 to another as well as the displacement of the lift truck 5 at least one a vertical direction along a single work space 4 comprise: first fixed racks 600 arranged along the runs to enable horizontal movement of the lift truck 5; second fixed racks 700 associated to the vertical structures to enable movement of the lift truck 5 in a vertical direction along the work space 4.

Means for drawing are provided, associated to the lift truck 5, which interact alternatively either with the first fixed racks 600 or with the second fixed racks 700 to produce a controlled translation in both directions of the lift truck 5 along the first fixed racks 600 or the second fixed racks 700.

The means for drawing comprise cogwheels 800 which are predisposed to realised, with the first fixed racks 600 or the second fixed racks 700, rack and pinion type couplings for transmission of non-drag drive.

The second fixed racks 700 are in part externally side-by-side with the first fixed racks 600 at which position they are provided with tracts of curved connecting cogging 701.

The pairs of coaxial cogwheels 800 of the lift truck 5 can be displaced, on command, by simple axial movement, from the enmeshed position with the first fixed racks 600 to the enmeshed position with the second fixed racks 700 and vice versa, so as to realise rack and pinion-type couplings for transmission of non-drag drive alternatively with the first fixed racks 600 or with the second fixed racks 700 and vice versa.

Thus, simply according to the axial position of the wheels 800 the lift truck 5 can be moved either horizontally below the vertical structure 1 or vertically internally of one of the work spaces 4.

First fixed tracks 610 are located parallel by the side of the first fixed racks 600, so that the lift truck 5 can be supported on its own wheels 900 which roll on the first fixed tracks 610.

Idle second wheels 810 are provided, coaxially side-by-side with the cogwheels 800; these interact with second tracks 710 located parallel by the side of the second fixed racks 700 and having the function of stably guiding the lift truck 5 in its vertical displacements.

The passage from horizontal movement to vertical movement internally of the work spaces 4 is thus extremely simple and rapid.

Independently of the size of the configuration, the invention has the advantage of being built to function with one lift truck 5 only.

What is claimed is:

1. An automatic store comprising:
   at least two vertical structures constituted by a plurality of planes, each of which are adapted to house at least one container, which planes are superposed so as to be aligned on a vertical surface, a lift truck being adapted to transport at least one of the containers and being able to move in a vertical direction in a vertical work space parallel to and between the vertical surface on which the planes are aligned, the lift truck on command being able to be positioned facing one of the planes, and being able to interact with the planes in order to remove or insert a single container;
   further comprising a plurality of the vertical structures which are arranged parallel and afford a plurality of the work spaces for movement of the lift truck and are conformed to enable transfer of the lift truck at least from one of the work spaces to another of the work spaces;
   means being provided to enable and to operate a transfer of the lift truck from one of the work spaces to another of the work spaces as well as to operate a displacement of the lift truck at least in a vertical direction along a single work space of the work spaces,
   wherein the plurality of vertical structures have bases which are tunnel-shaped in order to afford a runway, perpendicular to the vertical structures, along which runway the lift truck can transit to transfer at least from one of the plurality of work spaces to another thereof or to stations which are external of the plurality of vertical structures;
   wherein the means to enable and operate a transfer of the lift truck comprise:
   first fixed racks predisposed along the runway to enable horizontal-direction movement of the lift truck;
   second fixed racks associated to the vertical structures to enable movement of the lift truck in a vertical direction along a work space; and
   means for drawing, associated to the first fixed racks or to the second fixed racks, for producing a controlled translation in two directions of the lift truck along the first fixed racks or along the second fixed racks,
   wherein the means for drawing comprise cogwheels which are predisposed to make, with the first fixed racks or with the second fixed racks, rack and pinion type couplings for transmission of motion with no dragging.

2. The automatic store of claim 1, wherein the second fixed racks are side-by-side externally of the first fixed racks, there being connecting tracts of curved cogging; pairs of coaxial cogwheels of the lift truck being displaceable on command by simple axial movement from a position of enmeshing with the first fixed racks to a position of enmeshing with the second fixed racks and vice versa, realizing rack and pinion type couplings for transmission of relative motion with no dragging alternatively with the first fixed racks and the second fixed racks.

3. The automatic store of claim 2, further comprising first fixed tracks located parallel by a side of the first fixed racks; the lift truck being provided with wheels for rolling support on the first fixed tracks; there being idle second wheels coaxially located by a side of the cogwheels for interacting with second fixed tracks located parallel by a side of the second fixed racks and having a function of stably guiding the lift truck in its vertical displacements.

4. The automatic store of claim 1, the means to enable comprise:
   first fixed tracks predisposed along the runway for guiding the lift truck;
   second fixed tracks associated to the vertical structures for guiding the lift truck in a vertical direction along a work space; and
   means for drawing, associated to the lift truck, for interacting alternatively with the first fixed guides or with the second fixed guides in order to produce a controlled translation in two directions of the lift truck along the first fixed tracks or along the second fixed tracks.

5. The automatic store of claim 4, wherein the means for drawing comprise drawing groups which are predisposed to realize, with the first fixed tracks or with the second fixed tracks, couplings for transmission of motion with no dragging.

6. The automatic store of claim 5, wherein the lift truck comprises at least two oppositely-situated drawing groups which are aligned along one of the first fixed tracks; at least one of the drawing groups being predisposed to interact with the one of the first fixed tracks, with a sliding coupling for transmission of drive with no dragging; the drawing groups being destined to couple and interact with two of the second fixed tracks, opposite and facing one another, fixed to two facing vertical structures of the plurality of vertical structures which define a work space of the plurality of work spaces.

7. The automatic store of claim 6, wherein the drawing groups which are opposite are symmetrically pivoted to the lift truck about two axes which are perpendicular to a vertical plane in which the first fixed track is situated, along which vertical plane the two drawing groups are aligned, and by the two second fixed tracks which are opposite one another and fixed to two facing vertical structures of the plurality of vertical structures; the two drawing groups being commanded to make symmetrical displacements from a position in which they are coupled with the first fixed tracks into a position in which they are coupled with the second fixed tracks and vice versa by means of a self-centring device comprising a rotor which is hinged to first ends of two con rods which exhibit second ends which are hinged to the two drawing groups.

8. The automatic store of claim 7, wherein each drawing group comprises a frame on which two wheels, with parallel axes, are mounted, on which two wheels a chain is ring-wound, the chain affording a plurality of holes which are aligned and equidistanced one from another; the first fixed tracks and the second fixed tracks being provided with projecting pins which are aligned, equidistanced and dimensioned in order to insert into the plurality of holes of the chain when the chain is brought into proximity of the first fixed tracks and the second fixed tracks.

9. The automatic store of claim 8, wherein at least one of the two wheels is a drive wheel and draws the belt in motion.

10. The automatic store of claim 9, wherein at least the drive wheel of the two wheels is cogged, and in that the belt which enmeshes with the wheel and is drawn in motion thereby is cogged.

11. The automatic store of claim 10, wherein each drawing group is hinged to the lift truck about an axis which coincides with an axis of a wheel of the wheels.

12. The automatic store of claim 11, wherein the wheel of the wheels is a drive wheel.

13. The automatic store of claim 6, characterised in that each drawing group comprises a frame on which at least one cogwheel is mounted, which cogwheel is brought on command to enmesh alternatively with first racks and with second racks which are respectively solidly constrained to the first fixed tracks and the second fixed tracks.

14. The automatic store of claim 13, wherein the cogwheel is a drive wheel.

15. The automatic store of claim 14, wherein the frame is hinged to the lift truck about an axis which is parallel to a rotation axis of the cogwheel and is located at a predetermined distance therefrom.

* * * * *